S. Tarrer,
Saw Teeth,

N° 18,474. Patented Oct. 20, 1857.

Witnesses.
Tho. M. Ross
M. F. Tarr.

Inventor.
Samuel Tarr.

UNITED STATES PATENT OFFICE.

SAML. TARVER, OF AUGUSTA, ARKANSAS.

RECIPROCATING MILL-SAW.

Specification of Letters Patent No. 18,474, dated October 20, 1857.

*To all whom it may concern:*

Be it known that I, SAMUEL TARVER, of Augusta, Jackson County, State of Arkansas, have invented a new and useful Machine for Cutting Plank or Lumber from the Stick; and I do hereby declare that the following is a full, clear, and exact description of the construction and operation of the same, reference being had to the annexed drawings, which make part of this specification.

The nature of my invention consists in providing a hollow blade with artificial teeth so attached that the chip or dust cut by the teeth will not lodge or impact behind them, but pass out through the machine somewhat after the manner that a shaving escapes an ordinary hand plane.

I will now endeavor to describe its construction and operation.

Figure 2:
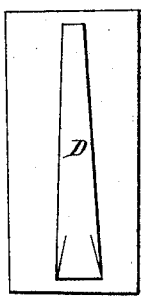
Figure 3:
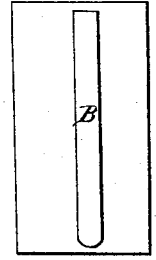
Figure 1:
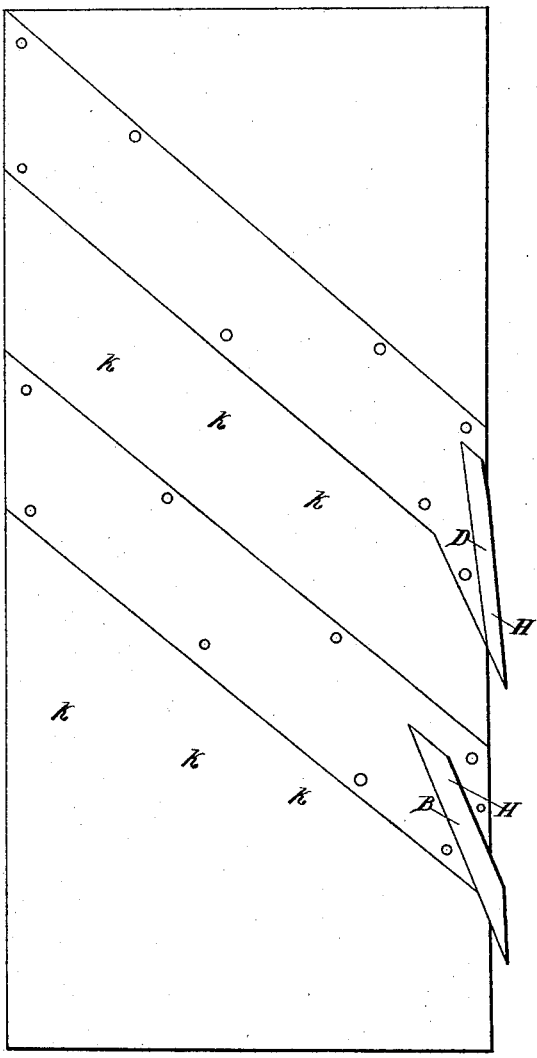

Between two steel plates (say) six feet long, six inches broad, and one sixteenth of an inch thick, I fix two bars as shown in Figure 1 of drawing by E, E T. These bars are about one and one half inch broad and three sixteenths of an inch thick, reaching transversely throughout the plates and secured in their places by rivets passing through themselves and plates, braded, soldered or otherwise secured thus. Into the lower bar E T, the gage tooth B is inserted, of which Fig. 3 gives a front view. This gage is merely slipped into a notch cut into its bar (and fastened by a screw of which H is the head) in Fig. 1 seen. The gage B is so arranged and directed in Fig. 1, that it may approach the wood in a cutting direction, and dispense its dust conveniently along the chamber or route as indicated by the line of K K K in drawings. Upon the upper bar E, the chisel tooth, (of which Fig. 2 gives a front view) is fastened in the manner as described in Fig. 1, where the head of the screw H is seen, its body passing through the tooth and fastening into the shank of the bar.

I will now endeavor to describe its operation.

Figure 4:
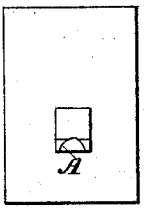

Two teeth (a gage and a chisel) make up a set and fully accomplish the removal of the kerf or plug. Fig. 4 of drawings represents the wood which must be removed in order that the machine clear itself:—A is the part to be removed by the gage. o, o, the parts to be removed by the chisel. Take this machine now formed, and suspend in the sash and manner of an ordinary upright saw, noticing that the plates be equidistant to each other throughout, and we are ready to describe its operation. It is now set up and operated like any upright saw, with the exception that the feed of the carriage with the log must be instantaneous and occurring just before the sash begins to descend. However the feeding gearing, being parts of other machinery, we cannot allude to here. The stroke to be given this instrument must be determined by the size of your timber and length of your plates. If one set of teeth be used only, a stroke of 24 inches will be required to divide a stick of 20 inches diameter.

The inventor believes that the foregoing described instrument cannot be superior to the old modes and machines for making plank on a large scale, but deems it very applicable to small powers, such as gin gearing &c.—therefore suitable to farmers and mechanics, who do not wish to purchase heavy powers.

I am aware that artificial teeth have been used prior to this, but they have been set upon a single blade, whereas my teeth are set between two plates. The difference is that behind the teeth in the former case the dust is liable to impact, whereas in the latter case it will pass out as fast as formed.

What I claim as my invention and desire to secure by Letters Patent, of the United States is—

A hollow saw so constructed as that the dust will pass from it as fast as formed, and therefore contained in that association of parts described by B, D, E, E T, H, H, K, K, K, in the drawings; and by the two steel plates described in the specification,—for the use and purposes set forth.

SAMUEL TARVER.

Witnesses:
   THO. M. ROSS,
   M. F. TARVER.